Oct. 2, 1945. J. SCHADE 2,385,883
METHOD OF MAKING METAL PARTS FOR RING BINDERS
Filed Aug. 19, 1944 2 Sheets-Sheet 1
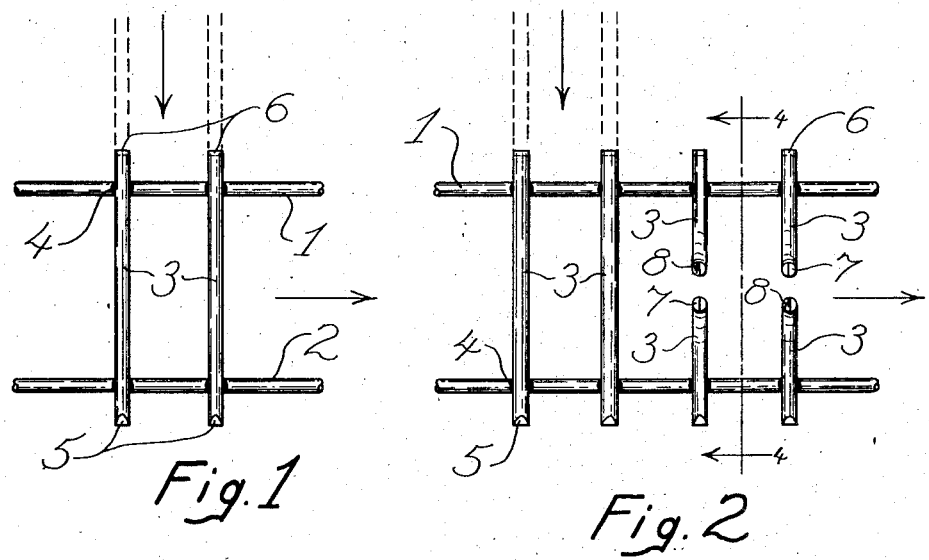
Fig. 1
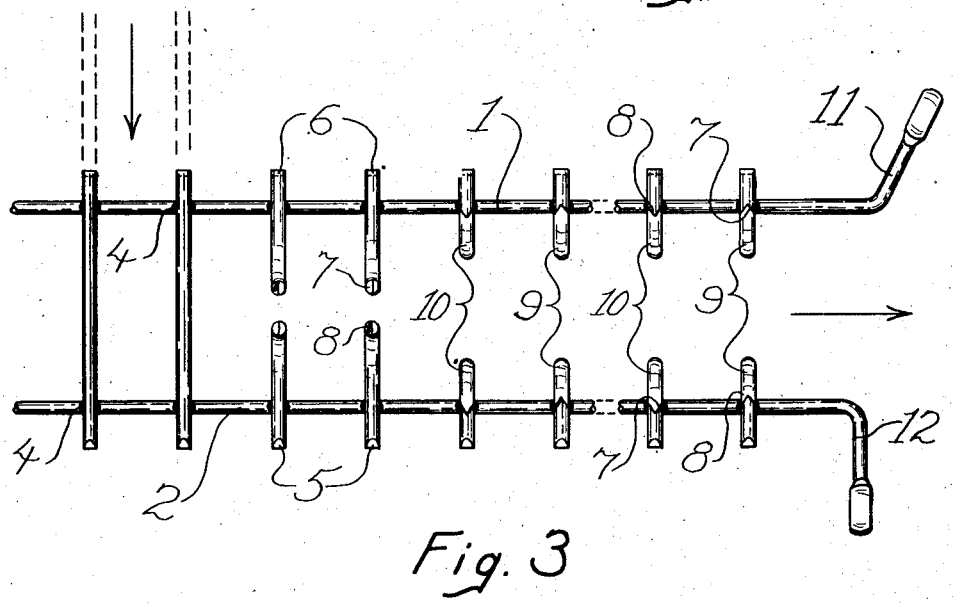
Fig. 2
Fig. 3
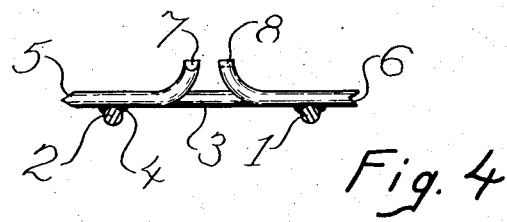
Fig. 4
INVENTOR
JOHN SCHADE
BY Chapin & Neal
ATTORNEYS Oct. 2, 1945.  J. SCHADE  2,385,883
METHOD OF MAKING METAL PARTS FOR RING BINDERS
Filed Aug. 19, 1944   2 Sheets-Sheet 2

INVENTOR
JOHN SCHADE
BY Chapin & Neal
ATTORNEYS

Patented Oct. 2, 1945

2,385,883

UNITED STATES PATENT OFFICE 2,385,883

METHOD OF MAKING METAL PARTS FOR RING BINDERS

John Schade, Holyoke, Mass., assignor to National Blank Book Company, Holyoke, Mass., a corporation of Massachusetts Application August 19, 1944, Serial No. 550,181

2 Claims. (Cl. 140—88)

This invention relates to a method of making metal parts for ring binders. It is closely related to a similar method disclosed in my Patent No. 2,368,730 of February 6, 1945.

The difference of the disclosures will be referred to as the detail is described. It will be understood that the present method has the purpose of cutting down the manufacturing cost for the product. In some respects it provides a better way of shaping the elements than my former method. This is particularly so with regard to the metal parts for large size binders as will be explained.

Generally considered the method involves the assembly of two spaced parallel long wires, with a series of spaced transverse and relatively short wires fastened to the long ones, in long ladder-like formation. The short wires extend beyond the outer sides of the long wires and the length of the extension is less than the spacing of the long wires. Such assembly is made progressively. The cross wires are cut between the long wires and formed to make ring prong halves. These are made of the material between the long wires while the side extensions are formed into toggle frame parts or levers. The work of cutting and forming the parts is carried on progressively in grouped operations at work stations to which the material is fed step by step. The ladder-like formation of assembly helps to feed the work from station to station and to support the parts. The preferred arrangement is to perform several different operations simultaneously at different work stations as will be explained, then feed the material between stations and repeat the operations on succeeding portions so that long indefinite lengths of the product may be made which only need to be cut off to desired sizes for storage or immediate use.

To fully understand the method the detail needs to be understood and I will make a full disclosure with reference to the drawings:

Fig. 1 indicates the feed of the short wires to lay them across the long wires, the welding of these wires at their intersections, and the cutting off of the short wires from their supply strands so as to provide matching half joints at their opposite ends;

Fig. 2 indicates the work at another station where the short wires are cut at their mid portion, so as to make matching joints on the two ends resulting from cutting each wire, and partially shaping the ring prongs;

Fig. 3 indicates work at another station where the ring prongs are given complete shape, the long wires cut off, and short portions of the long wires at one pair of ends are bent up with such ends swaged to make finger operating toggle levers;

Fig. 4 is a view on the line 4—4 of Fig. 2;

Fig. 8 indicates an end view of the same parts but with rings in its open position.

Figure 5:
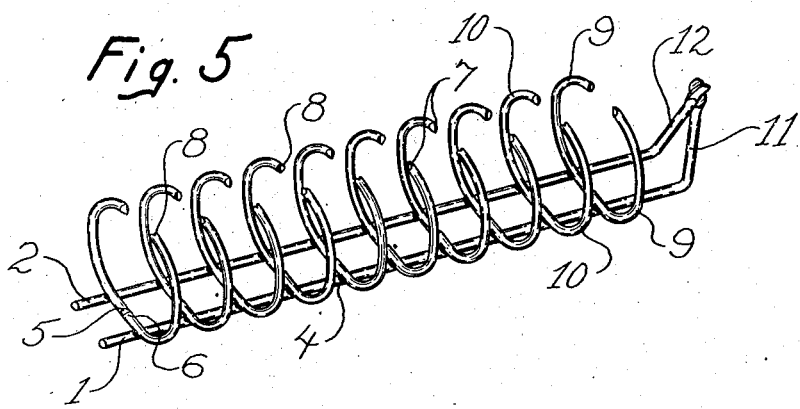
Fig. 5 is a view of finished pieces after they leave the work station at the right of Fig. 3, put in position for assembly with a spring plate.

Referring to Fig. 1, side wires 1 and 2 are fed step by step from a long supply. These wires are for the sides of a long ladder-like formation. At the work station represented by this figure, the cross wires 3 are fed from a long supply. As the long wires pause, the cross wires are fed in measured quantity and laid against the long wires. Their intersections are welded together as indicated at 4. Their measured quantities are cut off so as to make male and female joints of V formation. These are for toggle lever joints as will be explained. The joints are indicated at 5 and 6. These operations are grouped at the first work station preferably in this order: the long wires are fed in measured steps, and come to rest; the cross wires are fed in measured steps and come to rest; the intersections are clamped and welded, the measured quantity of cross wires 3 is cut off from the supply shown dotted and joints 5 and 6 made when the cuts are made. Thus when a succeeding quantity is fed and cut off joint halves 5 will be at the leading and joint halves 6 will be made at their trailing ends. Wires 3 may be fed one or more at a time, two being a convenient number for my plan.

The spaced portions of wires 3 between the wires 1 and 2 are of length desired for forming two ring prong halves. The two extensions in each wire 3, which are beyond the outer sides of wires 1 and 2, are of length to provide for two toggle levers which are to have their complementary joints 5 and 6 matched, as will be explained. The wide spacing of wires 1 and 2 is an important measurement in relation to the arrangement of material desired. This wide spacing has an advantage to be pointed out later. Wires 3 are spaced along wires 1 and 2 according to the desired spacing of rings in the mechanism or product being made. Any extensions desired beyond the end rings of such product may be easily arranged for by omitting the feeding of one or more wires 3 on the particular lengths of wires 1 and 2 wanted for the extensions. The use of the latter for a particular purpose will be referred to later.

Referring to Fig. 2, the right-hand pair of wires 3 indicates the work done at a second work station. The left-hand pair indicates the work already described as done at the first work station. The two pair in the same figure indicates the work which may be simultaneously carried out at two work stations and how the material may be fed from one work station to the succeeding one by feeding long wires 1 and 2 in measured steps. The work of two stations is indicated as finished in Fig. 2 and the material is ready to be shifted by moving wires 1 and 2 along one step. Such step will move a pair of wires 3 from the first station to the second station and another pair from the second station to a third station. The latter is not indicated in Fig. 2.

The work at the second station on the right-hand pair of wires 3 in Fig. 2, is indicated as follows: the wires are cut midway between wires 1 and 2, adjacent cut ends being formed with male and female half joints 7 and 8; the cutting operation is preferably made from below upwardly and the ring prongs partially shaped. This is indicated in Fig. 4. The material is then ready to move to the next work station.

Figure 6:
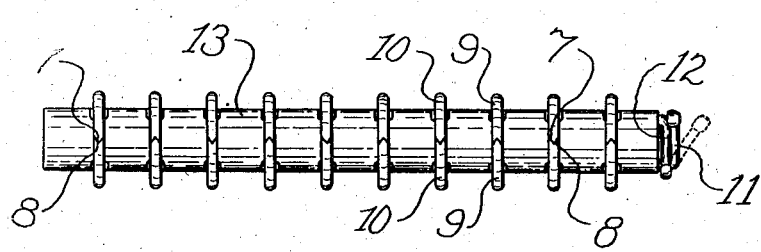
Fig. 6 is a view of the finished pieces of Fig. 5 assembled with a spring plate and ready to be fastened on the inside face of the back panel in a binder case.
Figure 7:
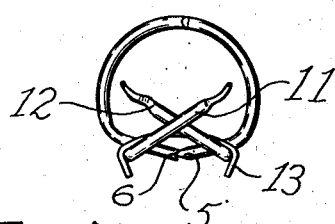
Fig. 7 is an end view of Fig. 6.
Figure 8:
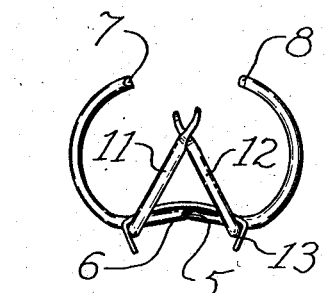

Referring to Fig. 3, the work at the third station is indicated on the right-hand pair of ring prongs 9 and 10, these being finally shaped at this station, as in Fig. 7. In addition the wires 1 and 2 are intermittently cut. The cut-off ends of wires 1 and 2 are bent up to form finger levers 11 and 12 for operating the toggle mechanism in a final assembly. Thus step by step the desired number of sets of ring prongs are finally shaped as in the pairs 9 and 10. Suppose there are ten pairs of ring prongs when the material is to form a ten ring binder. Then wires 1 and 2 without cross wires 3, are fed, this arrangement being provided for at the first work station. When these spaces reach the third station in suitable length without any cross wire 3, arms 11 and 12 are bent up as indicated. It should be noticed that the cutting off of wires 1 and 2 will finish the making of two complementary sides of a toggle mechanism with rings, which is complete when turned around as in Fig. 5 and then with a spring plate 13 as in Fig. 6 all put together.

At one end wires 1 and 2 are left straight. At the other end the finger levers 11 and 12 are bent up. The latter become the leading ends of wires 1 and 2 as the latter progress from work station 3 in the step by step movement to bring the material into position for the successive work operations as described. The straight ends occur after the product is cut off from wires 1 and 2. This is indicated in Fig. 3 where the right hand pairs of prongs 9 and 10 indicate the ones worked on and the left hand pairs indicate the progress of the work coming out of the last mentioned work station.

At the third work station, by way of example, the desired number of prong pairs 9 and 10 are finally shaped. This results in enough length of wires 1 and 2 carrying a desired spacing of the desired number of ring prongs to make the desired product except when levers 11 and 12 are wanted as a part. Material for the latter is provided, as previously mentioned, with omission of any cross wires, at the first station. The wires 1 and 2 are cut off to the right dimensions at the third work station, the end tabs are conveniently made by swaging, and the levers 11 and 12 preferably bent to the positions indicated.

As to the dimensions of spacing, these of course will vary according to the desired product. As a general proposition the product can be made in lengths which are multiples of the feeding distance steps between work stations. But when special dimensions are desired which do not permit this then such dimensions may be provided for by cutting out a waste piece as the work is finished at station 3.

When the work is finished at the third station and the two sections interchanged to bring joints 5 and 6 into a matching position, the formations on wires 1 and 2 appear as in Fig. 5. These pieces are then put in the assembly with a spring plate as in Fig. 6. The joints 5 and 6, as seen in Fig. 5, form the toggle lever points and joints 7 and 8 form the ring prong joints. The dotted and full line positions of levers 11 and 12 in Fig. 6, indicate a means for making the parts match in the spring plate. Then levers 11 and 12 are brought together from dotted to full line positions. Otherwise their crossed position might hamper the shifting of the joints for matching in the assembly work beyond the third work station.

The order of the work in carrying out the method steps can of course be varied to a considerable extent. I have described an order which is a convenient one as also the number of work stations described is convenient.

A special reason for spacing the wires 1 and 2 the distance about equal to the length of wire in ring prongs is this. By getting a wide spacing it is easier to apply shaping tools, such as cutting and forming dies between the widely spaced wires. It will be noticed that the cross wires are to be cut, joints made, and the ring prongs shaped. In making catalogue binders the wire material will be heavy as compared to smaller ring binders. In the working with heavy wire particularly, my present invention has an advantage over that of my before-mentioned copending application. Not only is there more room for working tools provided between wires 1 and 2 but there is also plenty of room for cutting the wire supply, forming joints 5 and 6, and working up manipulating levers such as 11 and 12.

The method described is available for making the product whether by hand tools, and by semiautomatic or fully automatic machinery.

Having disclosed my improved method, I claim:

1. The method of making multi-prong and toggle frame members for a loose leaf binder which consists in arranging a pair of long supporting wires in parallel spaced position, such spacing being at least equal to the length of two prong elements, moving said wires lengthwise in steps, positioning one or more short spaced cross wires on the long wires between said steps, such short wires being long enough for their end portions to extend at each side beyond said spaced long wires, far enough to provide toggle levers as extensions of the prong wires, fastening the wires as by welding at their intersections, thereby forming a ladderlike formation of wire, and between said steps forming the terminals of the extended ends of the cross wires into cooperating pairs of pivot joints, separating the portions between the side wires and forming them into complementary prong elements and cutting the two long wires into lengths such that the two with the prong elements thereon will serve for the multi-prong members of a loose leaf binder.

2. The method of making toggle frame and prong mechanisms for loose leaf binders which consists in feeding two parallel strands of side wires from a long supply and step by step to pause at different work stations, said wires being spaced apart a distance equal to two prong lengths, in feeding strands of cross wires from a long supply, laying them in parallel position across and in spaced relation against the long wires, in permanently fastening the wires at their intersections, said cross wires being fed and cut off in lengths to not only span the long wires but also to present extended short portions providing for toggle levers one from each outer edge of the long wires, shaping the terminals of such extended portions on cross wires for a toggle joint fit, cutting the intermediate portions of cross wires preparatory to forming complementary prong halves and forming such halves, and cutting the long wires in lengths to form complementary sides of toggle frame mechanisms, with prongs thereon, said operations except the first being performed in the pauses between the operations of such first or feeding operations of the long wires whereby the said mechanisms may be made economically in progressive fashion from long supplies of wire as it is operated on in the pauses of the feed of material to the working stations.

JOHN SCHADE.